Feb. 11, 1947.  H. F. KENNISON  2,415,500
MACHINE FOR CONSTRUCTING TANKS
Filed March 2, 1945  7 Sheets-Sheet 1

INVENTOR.
HUGH F. KENNISON
BY John C. Kerr
ATTORNEY

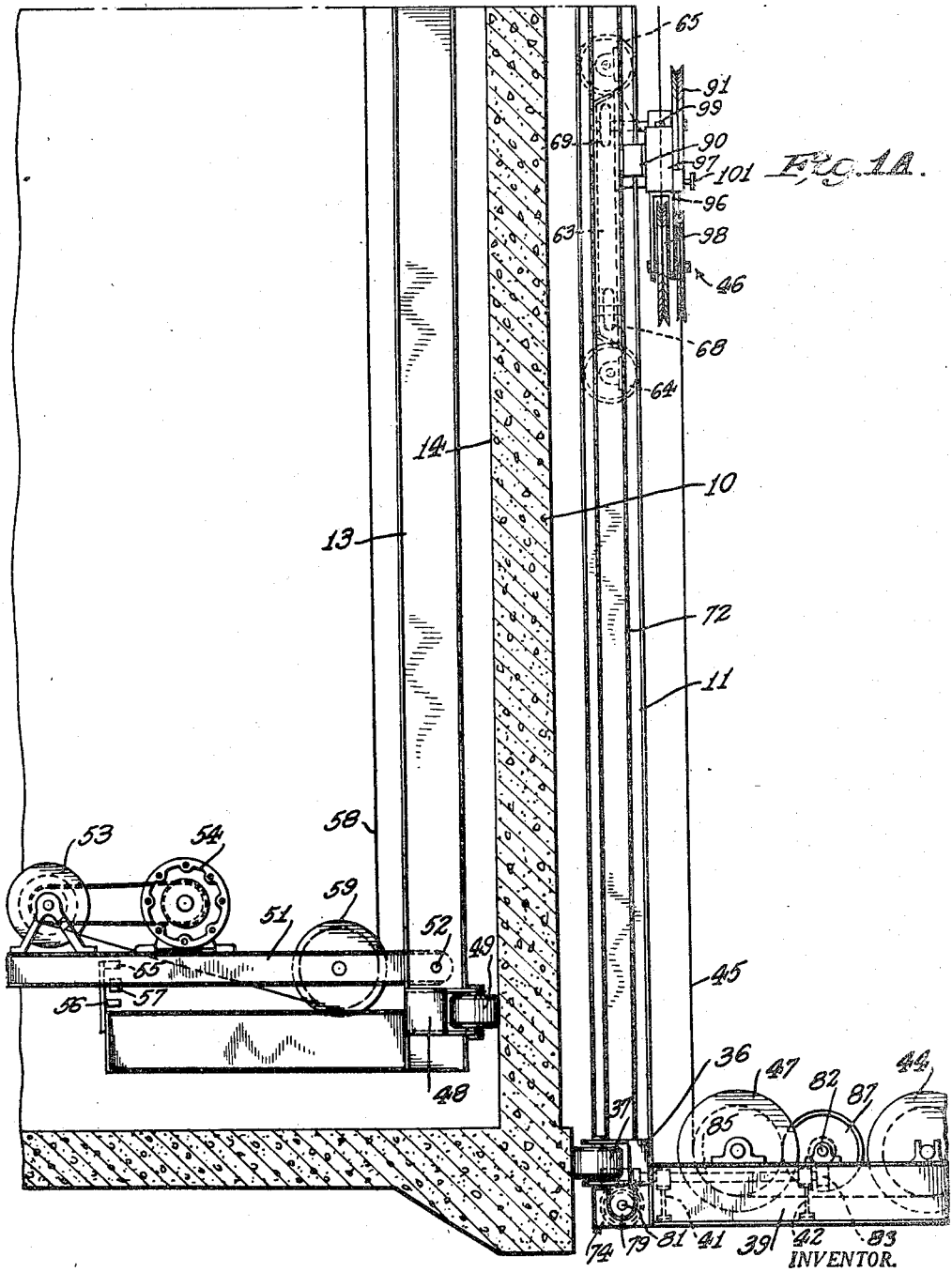

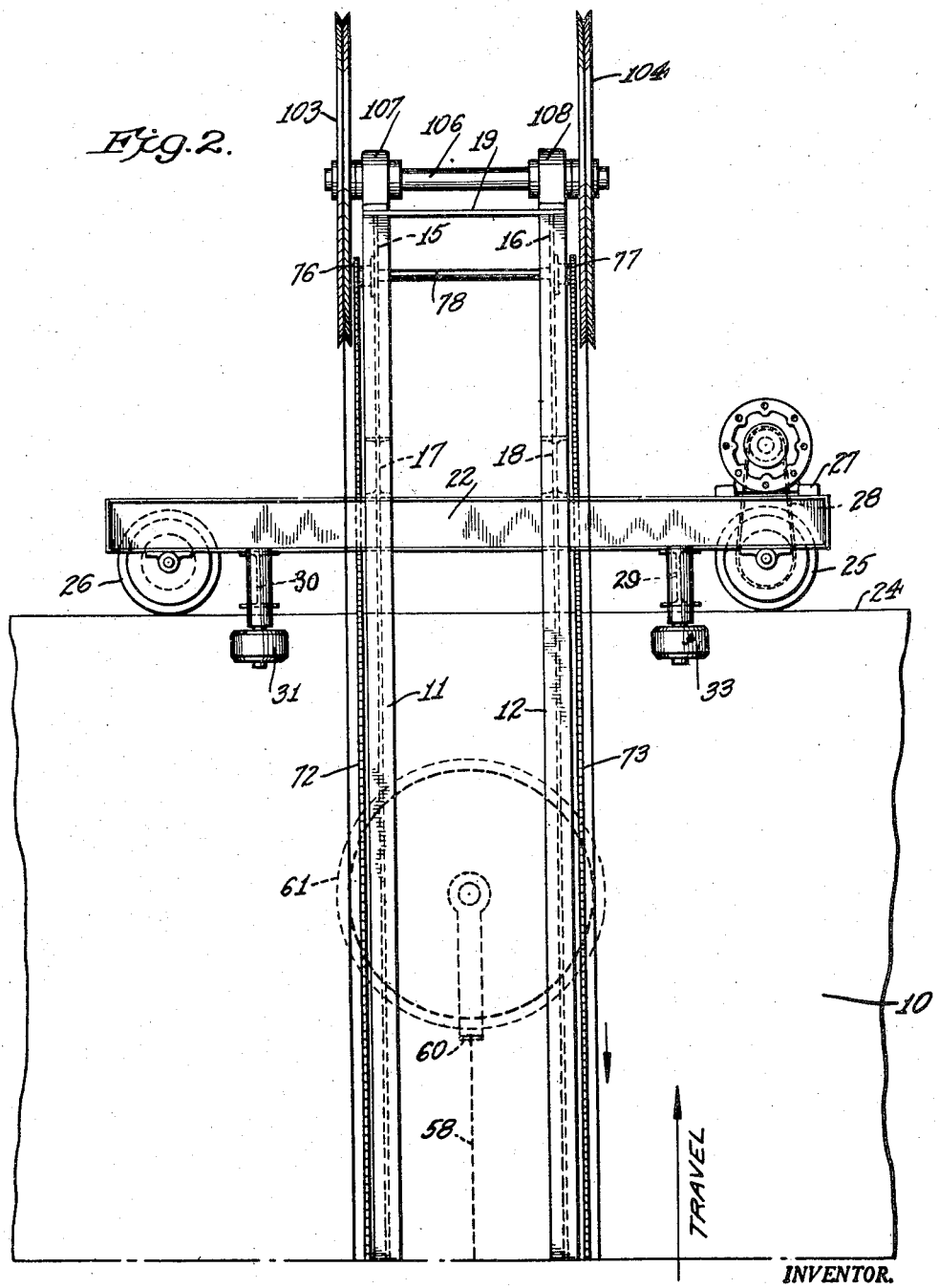

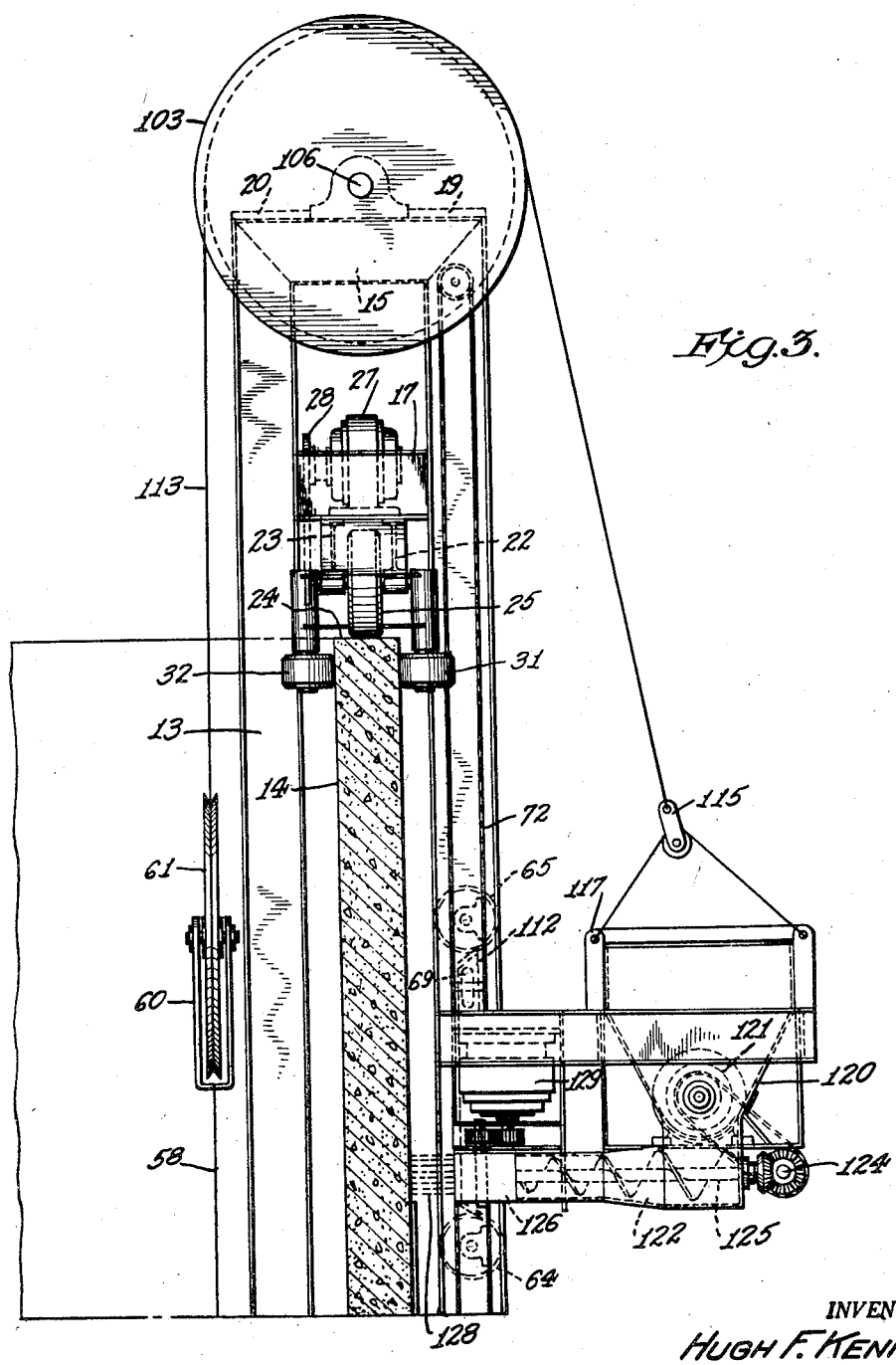

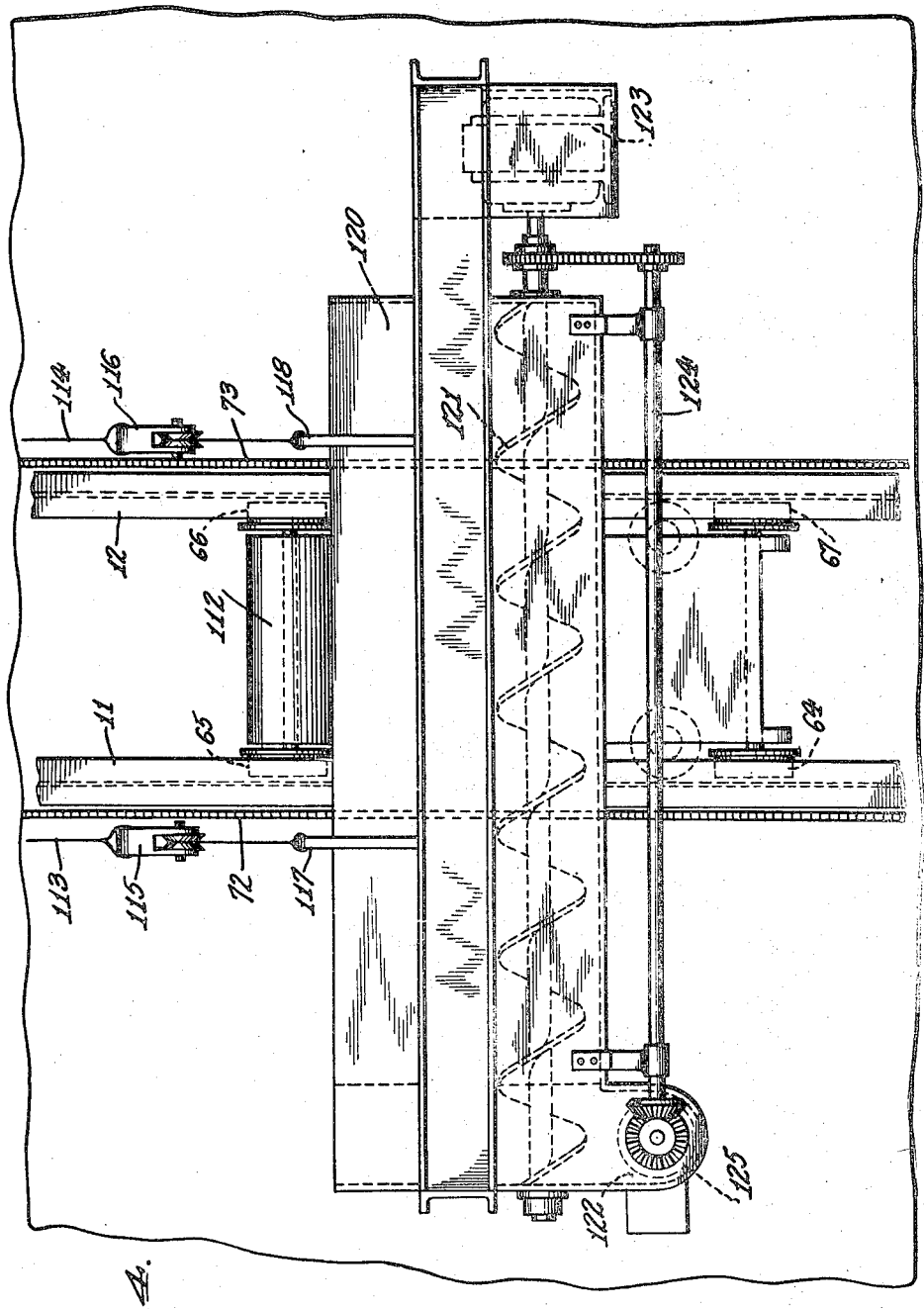

Feb. 11, 1947. H. F. KENNISON 2,415,500
MACHINE FOR CONSTRUCTING TANKS
Filed March 2, 1945 7 Sheets-Sheet 7
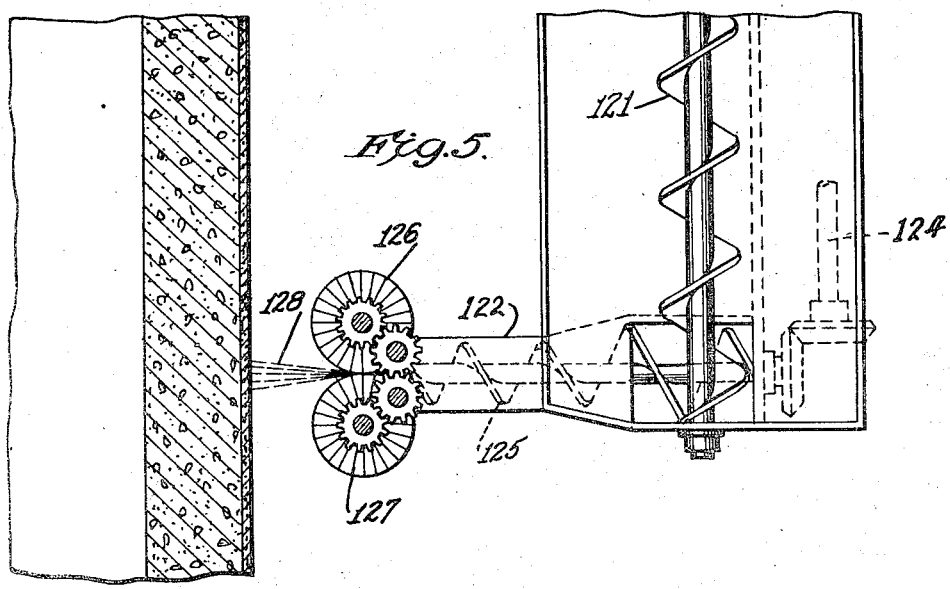
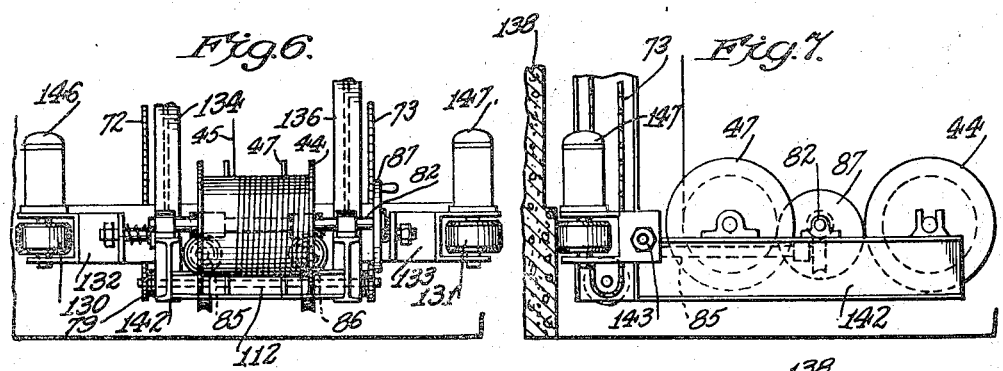
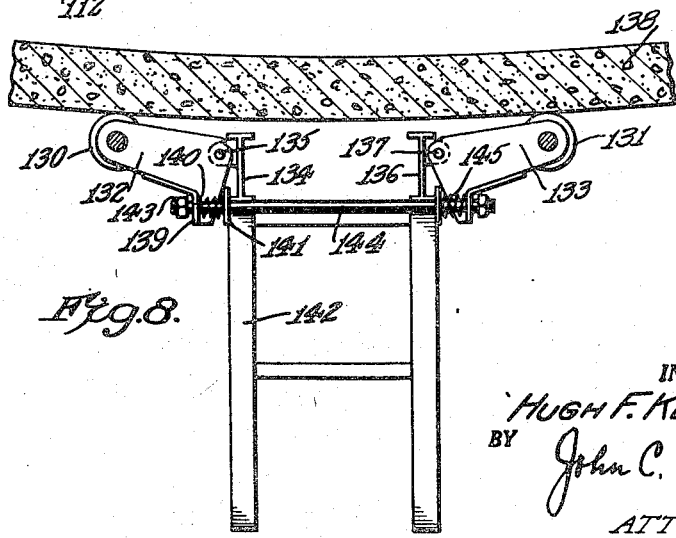
INVENTOR.
HUGH F. KENNISON
BY John C. Kerr
ATTORNEY

UNITED STATES PATENT OFFICE 2,415,500

MACHINE FOR CONSTRUCTING TANKS

Hugh F. Kennison, Bloomfield, N. J., assignor to Lock Joint Pipe Company, East Orange, N. J., a corporation of New Jersey Application March 2, 1945, Serial No. 580,697

10 Claims. (Cl. 242—7)

This invention relates to constructing machines for use in the construction of open-ended tanks and of other structures such as standpipes and large diameter pipes, and for banding hollow bodies and the coating of walls of any description.

Among the objects of the invention is to provide a machine which is entirely supported by a wall and whereby a tank or other hollow structure may be wrapped with wire as the machine is driven about the wall.

Another object of the invention is to provide a machine adapted to travel upon the top edge of a wall and apply a wire under a predetermined tension circumferentially about a tank.

Another object of the invention is to provide a machine adapted to straddle a wall and which is convertible for use in applying wire about a hollow body or for applying a coating to a wall of any description.

The machine embodying the invention has a U-shaped frame which straddles the sides of a wall and is driven along the wall on wheels which ride upon the upper edge of the wall. The leg of the frame facing the outside of the wall is provided with guides along which a wire-applying carriage is moved vertically. The outside leg of the frame also supports a spool for supplying wire to the wire-applying carriage. The inside leg of the frame supports a wire-tensioning mechanism including a sheave which is drawn downwardly for the purpose of applying tension in a loop of wire which constitutes a portion of the wire being applied to the outside of the tank. The frame is centrally supported on wheels which ride on the top of the tank wall. Thrust wheels are carried by the legs of the frame and bear horizontally against the inside and outside surfaces of the wall. A feature of the machine is that it is convertible to carry a mortar-projecting device in place of the wire-applying carriage and to employ the tensioning mechanism for producing force to counter-balance the weight of the mortar-applying device. The travelling frame may be readily applied to and removed from a tank as a unitary structure.

Other features and advantages of the present invention will be described in the accompanying specification and claims with reference to the drawings in which a machine embodying the principle of my invention is illustrated.

Fig. 1A is a side elevation of the lower end of the machine;

Fig. 2 is a front elevation of the upper end of the machine as viewed from outside a wall;

Fig. 3 is a side elevation of the upper end of the machine as used for applying a coating;

Fig. 4 is a front elevation of a portion of the machine showing a mortar-applying device;

Fig. 5 is a plan of the mortar-applying device shown in Fig. 4;

Fig. 6 is a front elevation of the lower portion of the outside leg of a travelling frame with a modified support for the thrust wheels;

Fig. 7 is a view taken from the left side of Fig. 6;

Fig. 8 is a plan of the modified support for the thrust wheels.

Figure 1:
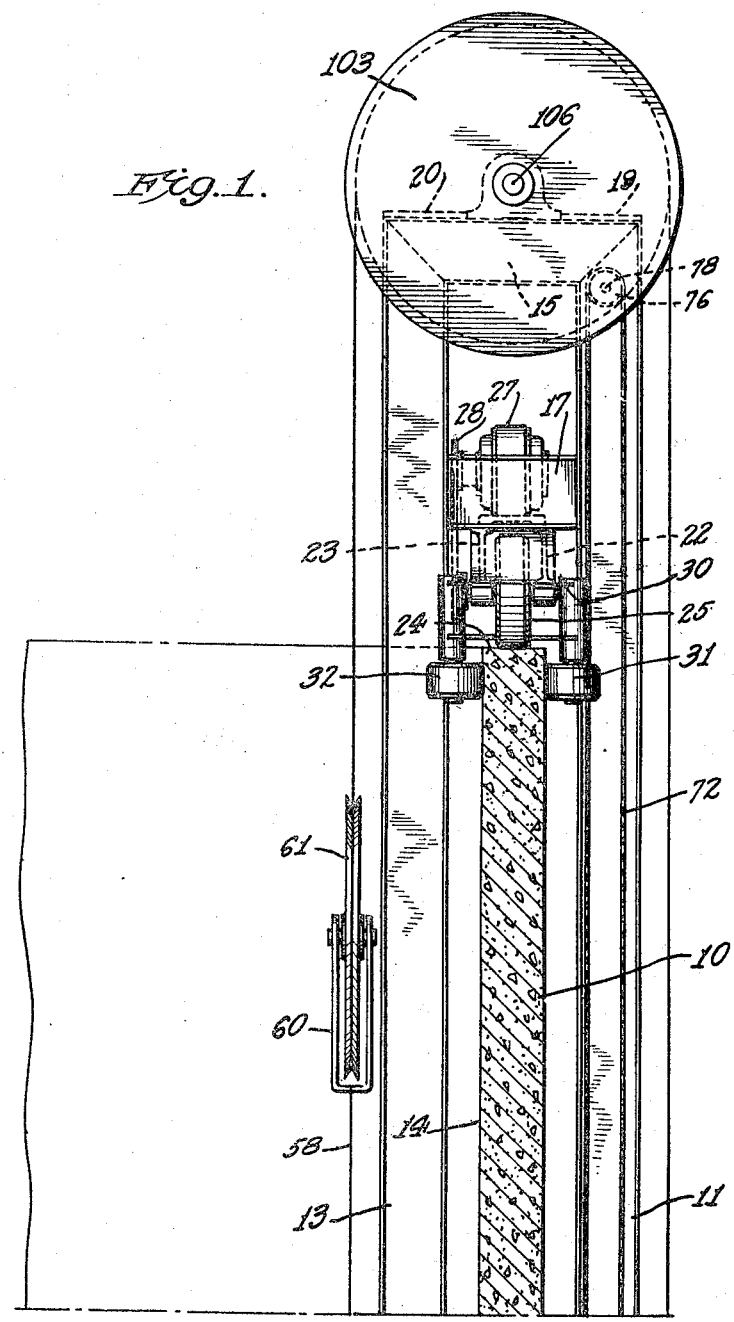
Fig. 1 is a side elevation of the upper end of the machine.

The travelling frame of the machine is in the form of an inverted U adapted to straddle a wall, as shown in Figs. 1 and 1A, with legs extending vertically at opposite sides of the wall. The leg of the frame which faces the outside surface 10 of a tank wall consists of two I-beams 11, 12, Figs. 2 and 2A, which are substantially parallel. There are two similar vertically extending I-beams constituting the leg of the frame facing the inside of the tank. One of these, I-beam 13, is connected to I-beam 11 by a horizontal beam 15. A similar vertically-extending I-beam (not shown), which also is located opposite the inner wall surface 14, is connected to I-beam 12 by a horizontal beam 16, Fig. 2. Horizontal beam 17, below beam 15, is connected to the outside and inside vertically-extending I-beams 11 and 13, and horizontal beam 18, below beam 16, similarly connects the vertically extending I-beam 12 with its companion I-beam opposite the inside surface of the wall.

The horizontal beams 15 and 16 are secured together by plates 19 and 20, and horizontal beams 17 and 18 are secured together by a pair of beams 22, 23, underlying the I-beams 17 and 18 and forming therewith a horizontal frame by which the travelling frame is adapted to be supported upon the upper edge 24 of the tank wall with the legs of the travelling frame facing opposite sides of the wall. A pair of wheels 25, 26 are journalled between beams 22 and 23 and are adapted to carry the frame in rolling contact with upper edge 24 of the tank. The drive for the carriage around the tank may be obtained by driving any wheel supported from the travelling frame and having traction contact with the tank. A motor 27 having a chain connection 28 with wheel 26 is suitable for advancing the frame.

A pair of beams 29 and 30 are connected to and extend under beams 22 and 23 and support bearings for rollers which bear laterally against the inside and outside surfaces of the tank wall, rollers 31 and 32 being supported from beam 30, and roller 33 and a corresponding roller (not shown) bearing against the inside surface 14 of the tank wall being supported from beam 29. Any number of these rollers may be power-driven for advancing the travelling frame.

Figure 2A:
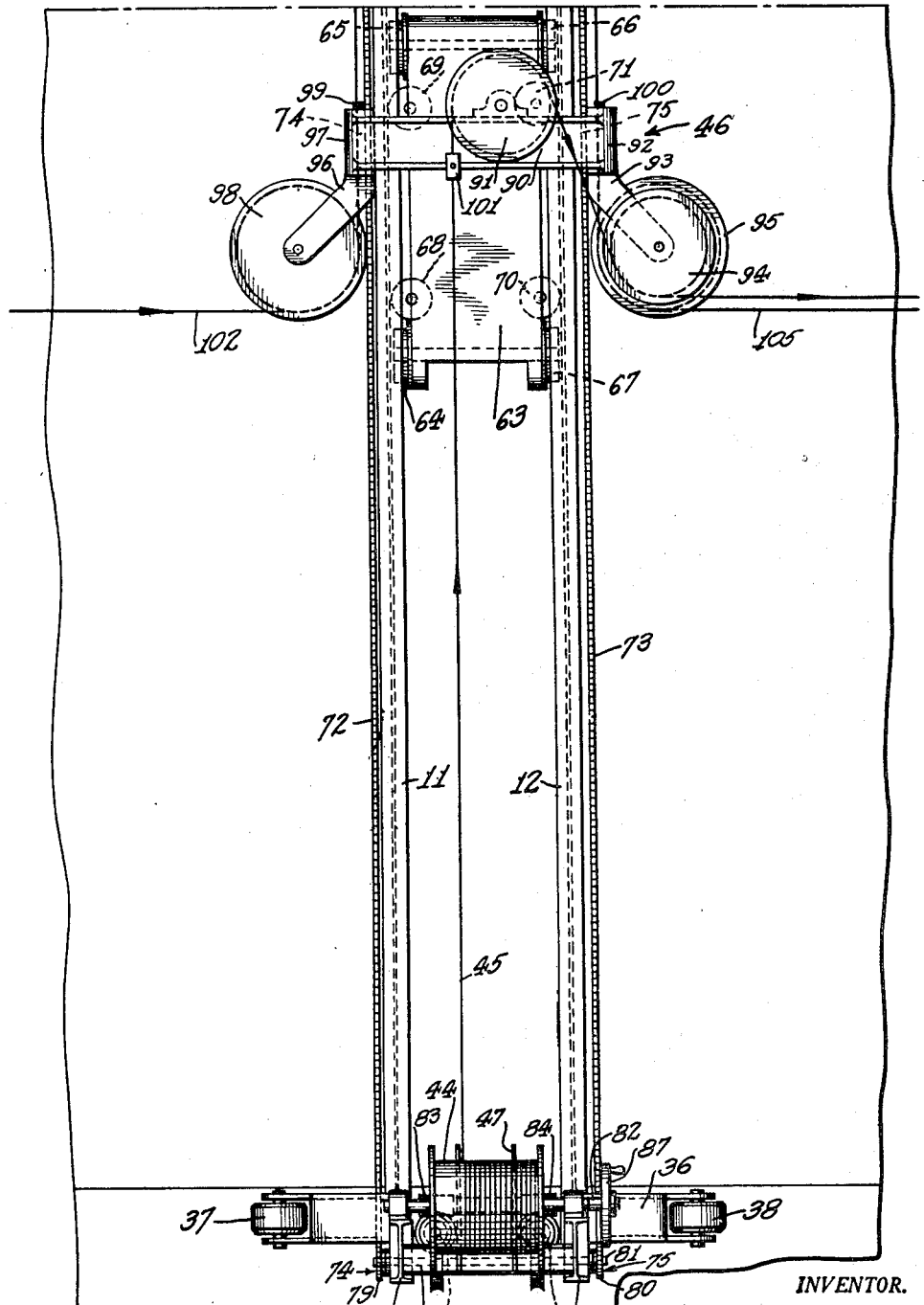
Fig. 2A is a front elevation of the lower end of the machine as viewed from outside a wall.

The lower ends of I-beams 11 and 12 of the outside leg of the travelling frame are connected together by a structural member 36, Figs. 1A and 2A, which extend laterally along the tank wall beyond the I-beams. A thrust roller 37 is mounted at one end of structural member 36 in such a manner as to bear against the exterior of the tank wall and a similarly acting roller 38 is mounted on the other end of structural member 36.

A pair of horizontally and outwardly extending beams 39 and 40 is supported in cantilever fashion from the lower end of I-beams 11 and 12, Fig. 1A. These horizontally-extending beams are connected together by structural members 41 and 42. The frame just described serves to support a supply spool 44 from which wire 45 is supplied to the wire-applying device 46. Upon leaving spool 44 the wire 45 passes under and is guided by a freely rotatable spool 47 which likewise is mounted upon the horizontally-extending frame.

Vertically extending I-beams of the inverted U-frame at the inside of the tank are connected together at their lower ends by a structural member 48 which also carries at its ends a pair of thrust rollers similar to roller 49, Fig. 1A, which bear against the inside surface of the wall.

The wire tensioning mechanism is also mounted at the lower ends of the vertically extending members of the frame at the inside of the wall. This comprises a weighing beam 51 pivotally mounted upon a shaft 52 which is carried by the inside vertically extending I-beams. The weighing beam has mounted thereon a winch 53 which is driven by a motor 54 whose operation is controlled by stops 55 and 56 which operate a switch 57 on the weighing beam 51. A cable 58 is wound around the winch and passes over a sheave 59 journalled on beam 51. The free end of cable 58 is attached to a yoke 60, Fig. 1, on which is mounted a freely rotatable sheave 61. During a wire-winding operation this sheave engages with a loop of the wire which is being wrapped around the tank and applies desired tension thereto.

The tension on the wire is determined by the downward pull exerted upon cable 58. As the wire is wound about the tank, it is extended in length as a result of the tension applied thereto through cable 58 and sheave 61 and this extension is taken up by the downward travel of sheave 61 within the distance provided between the upper and lower ends of the main frame. In advancing from the upper end of the frame to the lower end of the frame, cable 58 is maintained taut by the operation of winch 53 and the motor 54. The motor is started when the weighing beam drops and switch 57 comes into contact with stop 56, and the operation of the motor is discontinued when the weighing beam rises sufficiently to cause switch 57 to be operated by contact 55 to break the motor connection. By means of this control the tension in cable 58 and in the wire being wound about the tank is maintained substantially constant under a pull whose force may be predetermined and governed by the load applied to the weighing beam 51.

The wire-applying carriage 46 is illustrated in Figs. 1A and 2A. This carriage includes a chassis 63 which has mounted thereon rollers 64, 65, 66 and 67. Rollers 64 and 65 bear against the inner faces of the flanges of I-beam 11 and rollers 66 and 67 bear against the inner surfaces of the flanges of I-beam 12. Chassis 63 also carries a pair of rollers 68 and 69 which bear against the web of I-beam 11, and rollers 70 and 71 which bear against the web of I-beam 12. These eight rollers provide rolling contact for guiding the chassis as it moves vertically between I-beams 11 and 12.

The carriage is moved along the tracks provided by I-beams 11 and 12 by means of a pair of endless chains 72 and 73, the ends of chain 72 being attached to the carriage at 74 and the ends of chain 73 being attached to the carriage at 75. These chains run over sprocket wheels at the upper and lower ends of the main frame. The upper sprocket wheels 76 and 77 are keyed to shaft 78 which is journalled between I-beams 11 and 12. The lower ends of chains 72 and 73 pass over sprocket wheels 79 and 80, respectively, which are keyed to a shaft 81 journalled between the lower ends of I-beams 11 and 12.

The drive for the endless chains is obtained through shaft 81 from a drive shaft 82, Figs. 1A and 2A. The drive shaft carries a pair of worms 83, 84, which respectively engage wormwheels on shafts 85, 86. These latter shafts are journalled in bearings supported by beams 41 and 42. Each of these shafts has a worm and worm-wheel connection with shaft 81 upon which the lower sprocket wheels 79 and 80 are mounted. The worm and worm-wheels are of a self-locking type which effect restraint against the dropping of the wire-applying carriage. The wire-applying carriage is moved relatively slowly in a vertical direction and it is satisfactory to employ a hand wheel 87 by which shaft 82 may be turned, or a low speed motor may be used for this purpose.

The chassis 63 of the wire-applying carriage has mounted thereon a horizontal beam 90 upon which a sheave 91 is rotatably mounted. A bracket 92, at the right side of the carriage, Fig. 2A, is secured to beam 90 and provides a vertical bearing for an arm 93 on which are mounted two sheaves 94 and 95 which are freely rotatable independently of each other. A similar arm 96 is mounted for rotation about a vertical axis in bracket 97 at the other end of beam 90. This latter arm carries a freely rotatable sheave 98. These sheaves control the laying of turns of wire about the tank or other object.

The centers of the vertical shafts of arms 93 and 96 are bored so as to provide space for the free passage of reaches of the wire which extend upwardly and over the top of the main frame and downwardly to sheave 61 on the inside of the tank during a winding operation. Clamps 99 and 100 are carried by brackets 97 and 92, respectively, and are employed for fastening the wire to the carriage before a wire-winding operation and until the tensioning mechanism is started.

101 is a friction brake which is carried by and fastened to beam 90 and is used to keep sufficient frictional force in the wire in order that the first wrap of wire about the tank will develop sufficient friction to resist the imposed load of the tensioning mechanism. During a wire winding operation it is rendered ineffectual against the wire which freely slides therethrough.

For setting up the machine for a wire winding operation, wire is led off spool 44, passed under spool 47 and up to the wire-applying carriage. The wire passes freely through frictional brake 101, about sheave 91 and swivel sheave 94 and on around the tank. This wire returns to the carriage at position 102 and passes around swivel sheave 98, through the hollow shaft of arm 96 and through clamp 99, from where it passes vertically up to and around sheave 103 and vertically down on the inside of the tank to and around tensioning sheave 61 from which it extends vertically up and around sheave 104 and then down through clamp 100 and the hollow shaft of swivel arm 93, around sheave 95 and onto the tank, as shown at 105. At the commencement of the winding operation, this last-mentioned length of the wire is permanently fastened to the tank. Preferably, the winding is started at the base of the tank and the beginning of the wire is anchored there. As the wire winding machine travels around the tank in a clockwise direction, as viewed from above, the wire is wound around the tank from its anchored end. Sheaves 103 and 104 are mounted for rotation independently of each other on shaft 106 which is supported by bearings 107 and 108 fastened to beams 15 and 16 at the upper end of the travelling frame.

The length 102 of the wrapping of wire extending between sheaves 95 and 98 is a preliminary winding in advance of the wrapping being permanently applied at 105. The engagement of this preliminary wrapping with the tank wall provides sufficient tension in the wire to counteract the pull exerted thereon by the tension-applying mechanism. This advance temporary wrapping of wire is initially placed under sufficient tension for its frictional engagement with the tank wall by the use of frictional brake 101, which, when the machine is fully threaded and tension is applied, is freed from the wire.

As has been previously explained, the weighing beam 51 at the inside of the tank operates automatically to apply tension to the wire. When the wire is first threaded through the machine, sheave 61 is in a position just beneath sheaves 103 and 104. When the tensioning mechanism has developed the required tension in the wire, friction brake 101 is released and the machine is ready for operation.

The winding operation is begun with the winding carriage 46 at its lowest position, that is, with swivel sheaves 95 and 98 close to the foot of the tank where the advance and temporary wrappings of wire have been placed, as previously described, and the beginning end of the wire is anchored. Sheave 61 is at its highest position and the tensioning mechanism is put into operation for applying the proper load. The entire machine is now driven around the tank and the wire-applying carriage 46 is moved upwardly along I-beams 11 and 12 by the operation of shaft 82. This upward or vertical movement of the carriage can be a uniform or periodic movement, as desired. Hand wheel 87 can be turned a predetermined number of revolutions to give a desired spacing of the wire as it is wrapped about the tank.

As the machine travels about the tank and the is applied it ultimately becomes necessary to cut out the section of wire which has been taken up by the tensioning sheave 61 as it is drawn from its uppermost position below sheaves 103 and 104 to its lowermost position just above the tensioning mechanism, Fig. 1A. The lengthening of the loop around sheave 61 is caused by the stretching of the wire under tension. To remove the excess length of wire from the loop, the machine is stopped and the reaches of wire extending vertically at the front of the machine are securely clamped to the wire-applying carriage by tightening clamps 99 and 100. This serves to fasten both reaches of the wire at each side of the loop. Thereafter the operation of the wire tensioning mechanism is discontinued and the clamps 99 and 100 serve to retain the tension previously applied to the wire passing over sheaves 95 and 98 and encircling the tank. Sheave 61 is then lifted to its highest position while cable 58 is unwound from winch 53, and the excess wire of the loop is cut out. The two free ends hanging down from sheaves 103 and 104 are spliced together under sheave 61. The tensioning mechanism is then placed in operation, putting the required load on the wire. With the load restored, clamps 99 and 100 are released and the machine is again put into operation by connecting power to motor 27. The removal of the excess wire, according to the previously-described procedure, is done as many times as necessary in the wrapping of a tank.

Additional wire will have to be provided as the supply from spool 44 is consumed. This is accomplished by stopping the machine, clamping the wire with brake 101, removing the empty spool 44 and replacing it with a new spool. When the end of the wire on the new spool is spliced to the end of the wire threaded through the machine, brake 101 is relieved, and the machine is ready for further operation. When the winding of the wire about the tank is completed, the end of the last winding is anchored to the wall of the tank, the operation of the wire tensioning mechanism is discontinued, and the unused portion of wire is cut next to the terminal anchor.

It is desirable to protect the wire winding by covering the same with a protective layer of material such as mortar or other form of plastic material. An advantage of the present machine resides in the fact that it may be employed for applying a coating to the outside of the tank. For this purpose the wire-applying carriage 46 is replaced by a carriage carrying a coating machine, Figs. 3, 4 and 5. The carriage for the coating machine has a chassis 112 and four pairs of rollers which engage the flanges and webs of the vertically-extending I-beams 11 and 12 in the manner previously described with respect to the wire-applying carriage 63. Endless chains 72 and 73 are fastened to chassis 112 whereby the coating machine is driven vertically as the result of operation of shaft 82 and hand wheel 87, as previously described.

The wire tensioning mechanism with its weighing beam 51 is employed as a counterbalancing force. For this purpose, a wire or cable is looped around sheave 61 and the reaches 113 and 114 of the loop are passed over sheaves 103 and 104 and attached to blocks 115 and 116, Fig. 4. Each of these blocks is attached to the coating machine at 117, 118, respectively. The weight upon the weighing beam 51 and the force applied thereby to wire 58 is such as to be slightly greater than the component of the load caused by the weight of the coating machine and its mortar load, so that as the chains 72 and 73 are paid off by the operation of hand wheel 87, the coating machine carriage will rise.

The coating machine includes a hopper 120 containing a screw conveyor 121 to carry the material in the hopper toward the discharge end of the hopper. The hopper discharges into a conduit 122 which is directed toward the wall of the tank. Screw conveyor 121 is directly connected with a low speed motor 123 which also drives a countershaft 124 which drives a screw 125 contained in conduit 122. Screw 125 forces mortar between the revolving brushes 126 and 127 whose peripheries are disposed at the discharge end of conduit 122. These cylindrical brushes are mounted on parallel vertical axes and geared to rotate in opposite directions and to project from therebetween a stream 128 of plastic material or mortar. The brushes are driven by a high speed vertically mounted motor 129. The brushes rotate at a high speed and forcibly project mortar or other plastic material against the tank wall where it readily adheres. The hopper 120 of the coating machine is periodically recharged from an outside mixer. The entire outside wall of the tank is coated by the travel of the machine about the tank and the periodic or uniform rise of the coating machine carriage.

In Figs. 6, 7 and 8 I have shown a modified manner of supporting the thrust bearing wheels at the lower portion of the travelling frame. Each of thrust wheels 130 and 131 is disposed on a vertical axis and carried by a lever 132 and 133, respectively. Lever 132 is supported from vertically-extending I-beam 134 by a pair of brackets and a hinge pin 135 which are carried by the I-beam. Lever 133 is similarly supported from I-beam 136 by a pair of brackets and a hinge pin 137. Each wheel is resiliently held against the wall of the tank 138. One arm of lever 132 carries a plate 139 against which spring 140 abuts. The other end of the spring abuts against a fixed plate 141 which is fastened to the flanges of horizontal I-beam 142. The compression in this spring tends to rock lever 132 clockwise, Fig. 8, and the limit of clockwise movement of the lever is determined by a nut 143. The spring 140 and the nut 142 are mounted upon a rod 144 which is welded to I-beams 134 and 136 and the position of nut 143 is adjustable for permitting engagement of wheel 130 with the tank load under the influence of the spring. Spring 145 is similarly mounted upon the other end of rod 144 and tends to rock lever 133 counterclockwise, Fig. 8, so as to resiliently press wheel 131 against the wall of the tank.

The springs 140 and 145 maintain the wheels 130 and 131 in traction contact with the wall of the tank and they may be used for driving the machine around the tank. This may be done by individual motors 146 and 147, Figs. 6 and 7. Motor 146 is mounted upon lever 132 and drives the shaft of wheel 130. Motor 147 is mounted upon lever 133 and drives the shaft of wheel 131. Similarly mounted wheels and motors may be used for engaging the inside surface of the tank. It will be appreciated that whether or not the horizontal thrust bearing wheels at the lower ends of vertically-extending I-beams 134 and 136 are resiliently pressed against the surface of the tank by springs, the tension in the wire being wrapped around the tank will cause sufficient pressure between the thrust wheels and the tank wall to effect traction.

What is claimed is:

1. A machine of the character described comprising, in combination, a frame having legs spaced apart for facing opposite sides of a wall, means connecting said legs together at their upper ends, roller means between said legs and arranged to support said frame on the upper edge of a wall, sheaves above said roller means for guiding a wire over said wall from side to side thereof, and rollers mounted on each of said legs for rolling against the inside and outside surfaces of said wall.

2. A machine of the character described comprising, in combination, a frame having legs spaced apart for facing opposite sides of a wall, means connecting said legs together at their upper ends, roller means between said legs and arranged to support said frame on the upper edge of a wall, a carriage mounted for vertical travel on one of said legs, load-supporting means mounted on the other of said legs, and means at the top of said frame for guiding a wire extending between said carriage and said load-supporting means.

3. A machine of the character described comprising, in combination, a frame having legs spaced apart for facing opposite sides of a wall, means connecting said legs together at their upper ends, roller means between said legs and arranged to support said frame on the upper edge of a wall, means mounted on the lower end of one of said legs for mounting a supply of wire, a carriage mounted for vertical travel on said last-named leg, sheaves mounted at the upper end of said frame for guiding the travel of wire from and to opposite sides of said frame, sheaves mounted on said carriage for training wire about a tank from the lower end of said first-named leg and to said sheaves at the upper end of said frame, load-supporting mechanism carried at the lower end of said other leg and having means for engaging a loop of wire extending from said sheaves at the upper end of said frame, and means for changing the position of said carriage vertically on said frame.

4. A machine of the character described comprising, in combination, a frame including spaced legs connected together at their upper ends, means for supporting said frame for travel about a tank with one leg inside the tank and one leg outside the tank, and means for applying a wire about said tank, said means being carried by said frame and including a carriage mounted for vertical travel on said frame.

5. A machine of the character described comprising, in combination, a frame having a pair of depending legs adapted to straddle a wall, means for supporting said frame in rolling contact with the upper edge of the wall, a wire-applying carriage, means for supporting said wire-applying carriage on said frame, means on one of said legs for guiding said carriage in vertical movement, means carried by said frame for supplying wire to said wire-applying carriage, wire-tensioning mechanism carried by said frame, and guide means at the upper end of said frame for training reaches of wire passing between said wire-applying carriage and said wire-tensioning mechanism.

6. A machine of the character described comprising, in combination, a frame having legs spaced apart for facing opposite sides of a wall, means mounted on said frame for supporting said frame on the top of a wall, means for advancing said frame along said wall, a wire-applying carriage mounted for vertical movement along guides carried by one of said legs, means for elevating said carriage, means for supporting a supply of wire at the lower end of said last-named legs, a wire-tensioning mechanism mounted on the other of said legs, and sheaves at the upper end of said frame whereby wire being wrapped about a wall is guided between said wire-applying carriage and said wire-tensioning mechanism, and means for spacing said legs from opposite sids of a wall.

7. A machine of the character described, comprising in combination, a travelling frame having inside and outside vertically extending members adapted to flank the inside and outside walls of a vertically standing tank, means connecting said vertically extending members together above the upper edge of a tank, roller means supported from said connecting means and adapted to roll upon the upper edge of a tank for supporting said travelling frame, means carried by said frame and adapted to bear upon the inside and outside walls of a tank, and means for applying a wrapping about said tank, said means being mounted on said frame and including a carriage vertically movable on said frame.

8. A machine of the character described, comprising in combination, a U-shaped frame having legs adapted to straddle a wall, means supporting said frame in rolling contact with the upper edge of the wall, means for driving said frame along the wall, a carriage mounted for vertical travel on one side of the frame, said carriage having means for directing a turn of wire about the tank, means on said frame for supporting a supply of wire, wire-tensioning mechanism, means carried on the other side of said frame for supporting said wire-tensioning mechanism, sheaves mounted at the upper end of said frame for guiding wire between said carriage and said wire-tensioning mechanism, means extending from either side of said carriage inwardly towards each other for transmitting horizontal thrust of the legs of said frame against a tank wall, and means for supporting said carriage vertically of said frame.

9. A machine of the character described comprising, in combination, a frame having legs spaced apart for facing opposite sides of a wall, means mounted on said frame for supporting said frame on a wall, said supporting means including wheels for attaining rolling contact with the top of the wall, vertically disposed rails along a leg of said frame for guiding a carriage, a carriage in engagement with said rails, counter-weighing mechanism mounted on the other leg of said frame, a cable extending from said counter-weighing mechanism to said carriage, and means on said frame for training said cable for travel lengthwise of said legs.

10. A machine of the character described comprising, in combination, a frame having legs spaced apart for facing opposite sides of a wall, means connecting said legs together at their upper portions, means for supporting said frame on the top of a wall, a coating device, means for guiding said coating device along one of said legs, counter-weighing mechanism for supporting at least a part of the weight of said coating device, means for supporting said counter-weighing mechanism on the other of said legs, a cable extending from said coating device to said counter-weighing mechanism, means carried by said frame for training said cable means mounted on said frame for moving said coating device along its supporting leg of the frame, and means for advancing said frame along a wall.

HUGH F. KENNISON.

REFERENCES CITED

The following references are of record in the file of this patent:

UNITED STATES PATENTS

| Number | Name | Date |
|---|---|---|
| 1,257,146 | Stevenson | Feb. 19, 1918 |
| 1,102,615 | Valentine | July 7, 1914 |
| 1,459,386 | Wright | June 19, 1923 |